US008990126B1

(12) United States Patent (10) Patent No.: US 8,990,126 B1
Bangalore et al. (45) Date of Patent: Mar. 24, 2015

(54) COPYING HUMAN INTERACTIONS THROUGH LEARNING AND DISCOVERY

(75) Inventors: Srinivas Bangalore, Morristown, NJ (US); Alistair Conkie, Morristown, NJ (US); Giuseppe Di Fabbrizio, Florham Park, NJ (US); Narendra Kumar Gupta, Dayton, NJ (US); Amanda Joy Stent, Coram, NY (US)

(73) Assignee: AT&T Intellectual Property II, L.P., Atlanta, GA (US)

( * ) Notice: Subject to any disclaimer, the term of this patent is extended or adjusted under 35 U.S.C. 154(b) by 1080 days.

(21) Appl. No.: 11/462,068

(22) Filed: Aug. 3, 2006

(51) Int. Cl.
*G06F 15/18* (2006.01)
*G06F 17/21* (2006.01)
(52) U.S. Cl.
CPC .................................. *G06F 17/211* (2013.01)
USPC ............................................................ 706/12
(58) Field of Classification Search
USPC ............................................................ 706/12
See application file for complete search history.

(56) References Cited

U.S. PATENT DOCUMENTS

| 4,630,304 | A | * | 12/1986 | Borth et al. | 381/94.3 |
| 5,694,558 | A | * | 12/1997 | Sparks et al. | 715/854 |
| 2002/0032564 | A1 | * | 3/2002 | Ehsani et al. | 704/235 |
| 2005/0080628 | A1 | * | 4/2005 | Kuperstein | 704/270.1 |
| 2008/0059149 | A1 | * | 3/2008 | Martin | 704/9 |

OTHER PUBLICATIONS

"Node Relations" Verified by wayback Machine back to 2003.*
Boyce, Susan. "Natural Spoken Dialogue Systems for Telephony Applications" Communications of the ACM vol. 43 Issue 9 Sep. 2000 p. 29-34.*
UPenn "Node Relations" [Online] Downloaded on Jun. 23, 2010. Used as Evidence to show inherency. p. 1-4. Mar. 2004, verified by wayback machine. http://www.ling.upenn.edu/~beatrice/syntax-textbook/box-nodes.html.*
Shriberg, Elizabeth, John Bear, and John Dowding "Automatic Detection and COrrection of Repairs in Human-Computer Dialog" HLT '91 Proceedings of the Workshop on Speech and Natural Language, 1992 p. 419-424.*
Levit, Michael. "Spoken Language Understanding without Transcrpitions in a Call Center Scenario" 2005 [Online] DOwnloaded Sep. 10, 2013 http://www1.icsi.berkeley.edu/~levit/papers/Thesis05.pdf.*

* cited by examiner

*Primary Examiner* — Ben Rifkin (57) ABSTRACT

A method, system and computer readable medium that generates a dialog model for use in automated dialog is disclosed. The method may include collecting a plurality of task-oriented dialog interactions between users and human agents for a given domain, identifying one or more task in each dialog interaction, identifying one or more subtasks in each identified task and associating relations between the subtasks, identifying a dialog act and a set of predicate-argument relations for each subtask, generating one or more clauses from the set of predicate-argument relations, storing the tasks, subtasks, dialog acts predicate-argument relations, and clauses from each dialog interaction as a dialog interaction set, generating a dialog management model using the stored dialog interaction sets.

20 Claims, 4 Drawing Sheets

COPYING HUMAN INTERACTIONS THROUGH LEARNING AND DISCOVERY

BACKGROUND OF THE INVENTION

1. Field of the Invention

The present invention relates to a feature for use in automated dialog systems and more specifically, to a method and system that copies human interactions through learning and discovery.

2. Introduction

Approaches to sentence-level processing tasks such as parsing, language modeling, named-entity detection and machine translation have become increasingly data-driven and empirical, with the availability of large amounts of data. The benefits of such a trend have been that the models for these tasks can be trained to capture the distributions of the phenomena in the data. These trainable models are more robust as compared to the previously popular hand-crafted approaches.

This trend has yet to significantly impact the approaches to dialog management in dialog systems. Dialog management (both plan-based and call-flow based) have traditionally been hand-crafted and suffer the consequences of being unnatural and brittle. With the ability to record and store human-human conversations (such as in call-centers), it is anticipated that data-driven methods will influence approaches to dialog management in the near future.

SUMMARY OF THE INVENTION

A method, system and computer readable medium that generates a dialog model for use in automated dialog is disclosed. The method may include collecting a plurality of task-oriented dialog interactions between users and human agents for a given domain, identifying one or more task in each dialog interaction, identifying one or more subtasks in each identified task and associating relations between the subtasks, identifying a dialog act and a set of predicate-argument relations for each subtask, generating one or more clauses from the set of predicate-argument relations, storing the tasks, subtasks, dialog acts predicate-argument relations, and clauses from each dialog interaction as a dialog interaction set, generating a dialog management model using the stored dialog interaction sets.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION OF THE INVENTION

Additional features and advantages of the invention will be set forth in the description which follows, and in part will be obvious from the description, or may be learned by practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth herein.

Various embodiments of the invention are discussed in detail below. While specific implementations are discussed, it should be understood that this is done for illustration purposes only. A person skilled in the relevant art will recognize that other components and configurations may be used without parting from the spirit and scope of the invention.

The present invention comprises a variety of embodiments, such as a system, method, computer-readable medium, and other embodiments that relate to the basic concepts of the invention.

A successful dialog system relies on the synergistic working of several components: speech recognition (ASR), spoken language understanding (SLU), dialog management (DM), language generation (LG) and text-to-speech synthesis (TTS). While data-driven approaches to ASR and SLU are prevalent, such approaches to DM, LG and TTS are much less well-developed. Therefore, data-driven approaches require investigation for building all components of spoken dialog systems.

Current approaches to building dialog systems involve several manual steps and careful crafting of different modules for a particular domain or application. The process starts with a small scale data collection from dialog systems where subjects talk to a machine driven by a human "behind the curtains". A user experience (UE) engineer analyzes the collected dialogs, subject matter expert interviews, user testimonials and other evidences (e.g., customer care history records). This heterogeneous set of information helps the UE engineer to design some system functionalities, mainly: the semantic scope (e.g., call-types in the case of call routing systems), the LG model, and the DM strategy. A larger automated data collection follows, and the collected data is transcribed and labeled by expert labelers following the UE engineer recommendations. Finally, the transcribed and labeled data is used to train both the ASR and the SLU.

This approach has proven itself in many commercial dialog systems. However, the initial UE requirements phase is an expensive and error-prone process because it involves non-trivial design decisions that can only be evaluated after system deployment. Moreover, scalability is compromised by the time, cost and high level of UE know-how needed to reach a consistent design.

The process of building speech-enabled automated contact center services has been formalized and cast into a scalable commercial environment in which dialog components developed for different applications are reused and adapted. However, exploiting dialog data to train/adapt or complement hand-crafted components will be vital for robust and adaptable spoken dialog systems.

One of the aspects addressed by this invention is inferring predictive models to structure task-oriented dialogs. This is an incremental step in predicting the system state of a dialog manager and in predicting the system utterance during an incremental execution of a dialog. In particular, the invention concerns learning models for predicting dialog acts of utterances, and models for predicting subtask structures of dialogs.

Figure 1:
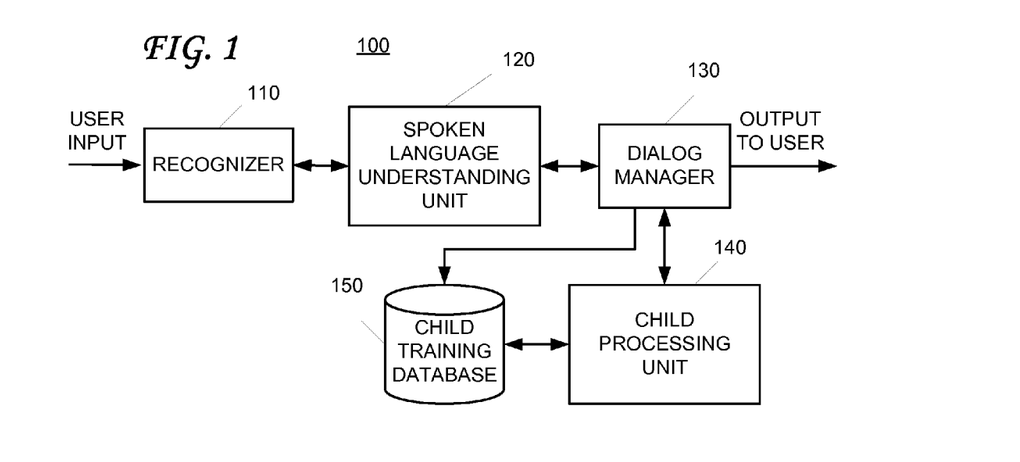
FIG. 1 illustrates an exemplary diagram of a dialog management system using the CHILD processing method in accordance with a possible embodiment of the invention.

FIG. 1 illustrates an exemplary automated Copying Human Interactions Through Learning and Discovery (CHILD) dialog system 100. The automated CHILD dialog system 100 may include recognizer 110 and spoken language understanding unit (SLU) 120, dialog manager 130, a CHILD processing unit 140 and CHILD training database 150.

The dialog manager 130 receives recognition data from a recognizer 110 and understanding data from the SLU 120 that are based on input communications from the user. The CHILD training database 150 stores dialog interaction sequences between the user and the dialog manger 130. The CHILD processing unit 140 processes the stored interactions in accordance with the invention as discussed herein with respect to the flowchart in FIG. 3. As a result, the CHILD processing unit 140 may provide input to the dialog manager 130 in order to generate an output response to the user. Once sufficiently trained, the CHILD processing unit 140 may replace the dialog manager 130 in the system 100.

The recognizer 110 and the SLU 120 are shown as separate units for clarification purposes. However, the functions of the recognizer 110 and the SLU 120 may be performed by a single unit within the spirit and scope of this invention.

The recognizer 110 and SLU 120 may operate using one or more of a variety of recognition and understanding algorithms. For example, the recognizer 110 and the SLU 120 may use confidence functions to determine whether the users input communications has been recognized and understood.

As a result, if the users input communication can be satisfactorily recognized and understood, the SLU 120 routes and/or processes the users input communication, which may include the request, comment, etc. In this instance, the dialog manager 130 would serve to provide and greeting/closing and to confirm the user's inputs, for example. However, if the users input communication cannot be satisfactorily recognized and understood, the dialog manger 130 may be required to conduct further dialog with the user.

Note that the recognizer 110 may be trained to recognize any number of communication symbols, both acoustic and non-acoustic, including grammar fragments, meaningful words, meaningful phrases, meaningful phrase clusters, superwords, morphemes, multimodal signals, etc., using any of the methods, known to one skilled in the art The CHILD processing unit 140 illustrated in FIG. 1 and its related discussion are intended to provide a brief, general description of a suitable computing environment in which the invention may be implemented. Although not required, the invention will be described, at least in part, in the general context of computer-executable instructions, such as program modules, being executed by a processing device 110, such as personal computer. Generally, program modules include routine programs, objects, components, data structures, etc. that perform particular tasks or implement particular abstract data types. Moreover, those skilled in the art will appreciate that other embodiments of the invention may be practiced in network computing environments with many types of computer system configurations, including personal computers, handheld devices, multi-processor systems, microprocessor-based or programmable consumer electronics, network PCs, minicomputers, mainframe computers, and the like. Embodiments may also be practiced in distributed computing environments where tasks are performed by local and remote processing devices that are linked (either by hardwired links, wireless links, or by a combination thereof) through a communications network. In a distributed computing environment, program modules may be located in both local and remote memory storage devices.

Figure 2:
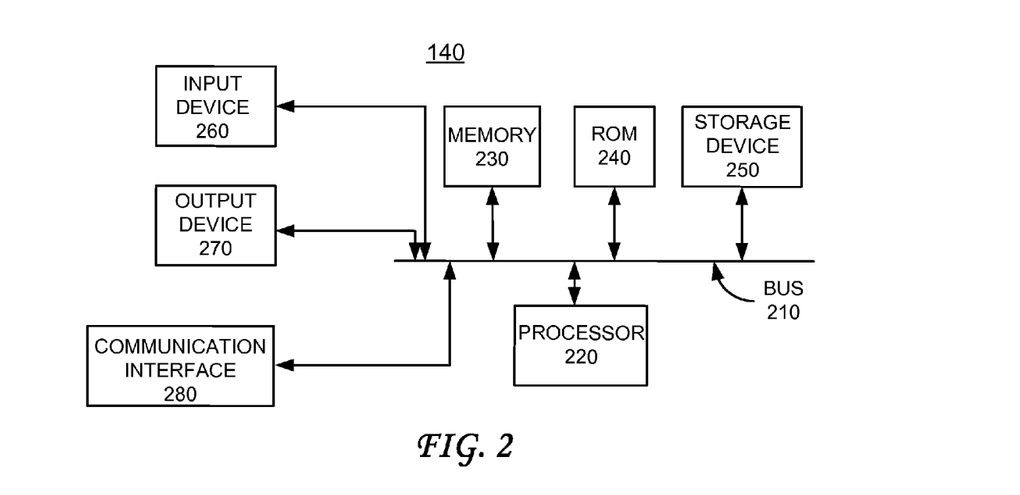
FIG. 2 illustrates an exemplary block diagram of a processing device for implementing the CHILD processing method in accordance with a possible embodiment of the invention.

FIG. 2 illustrates an exemplary CHILD processing unit 140 which may implement one or more modules or functions of the CHILD dialog system 100 shown in FIG. 1. For example, CHILD processing unit 140 may include may include a bus 210, a processor 220, a memory 230, a read only memory (ROM) 240, a storage device 250, an input device 260, an output device 270, and a communication interface 280. Bus 210 may permit communication among the components of processing device 110.

Processor 220 may include at least one conventional processor or microprocessor that interprets and executes instructions. Memory 230 may be a random access memory (RAM) or another type of dynamic storage device that stores information and instructions for execution by processor 220. Memory 230 may also store temporary variables or other intermediate information used during execution of instructions by processor 220. ROM 240 may include a conventional ROM device or another type of static storage device that stores static information and instructions for processor 220. Storage device 250 may include any type of media, such as, for example, magnetic or optical recording media and its corresponding drive.

Input device 260 may include one or more conventional mechanisms that permit a user to input information to the CHILD processing unit 140, such as a keyboard, a mouse, a pen, a voice recognition device, etc. Output device 270 may include one or more conventional mechanisms that output information to the user, including a display, a printer, one or more speakers, or a medium, such as a memory, or a magnetic or optical disk and a corresponding disk drive. Communication interface 280 may include any transceiver-like mechanism that enables the CHILD processing unit 140 to communicate via a network. For example, communication interface 280 may include a modem, or an Ethernet interface for communicating via a local area network (LAN). Alternatively, communication interface 280 may include other mechanisms for communicating with other devices and/or systems via wired, wireless or optical connections. In some implementations of the network environment 100, communication interface 280 may not be included in CHILD processing unit 140 when the dialog model generation process is implemented completely within a CHILD processing unit 140.

The CHILD processing unit 140 may perform such functions in response to processor 220 by executing sequences of instructions contained in a computer-readable medium, such as, for example, memory 230, a magnetic disk, or an optical disk. Such instructions may be read into memory 230 from another computer-readable medium, such as storage device 250, or from a separate device via communication interface 280.

Embodiments within the scope of the present invention may also include computer-readable media for carrying or having computer-executable instructions or data structures stored thereon. Such computer-readable media can be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium which can be used to carry or store desired program code means in the form of computer-executable instructions or data structures. When information is transferred or provided over a network or another communications connection (either hardwired, wireless, or combination thereof) to a computer, the computer properly views the connection as a computer-readable medium. Thus, any such connection is properly termed a computer-readable medium. Combinations of the above should also be included within the scope of the computer-readable media.

Computer-executable instructions include, for example, instructions and data which cause a general purpose computer, special purpose computer, or special purpose processing device to perform a certain function or group of functions. Computer-executable instructions also include program modules that are executed by computers in stand-alone or network environments. Generally, program modules include routines, programs, objects, components, and data structures, etc. that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Figure 3:
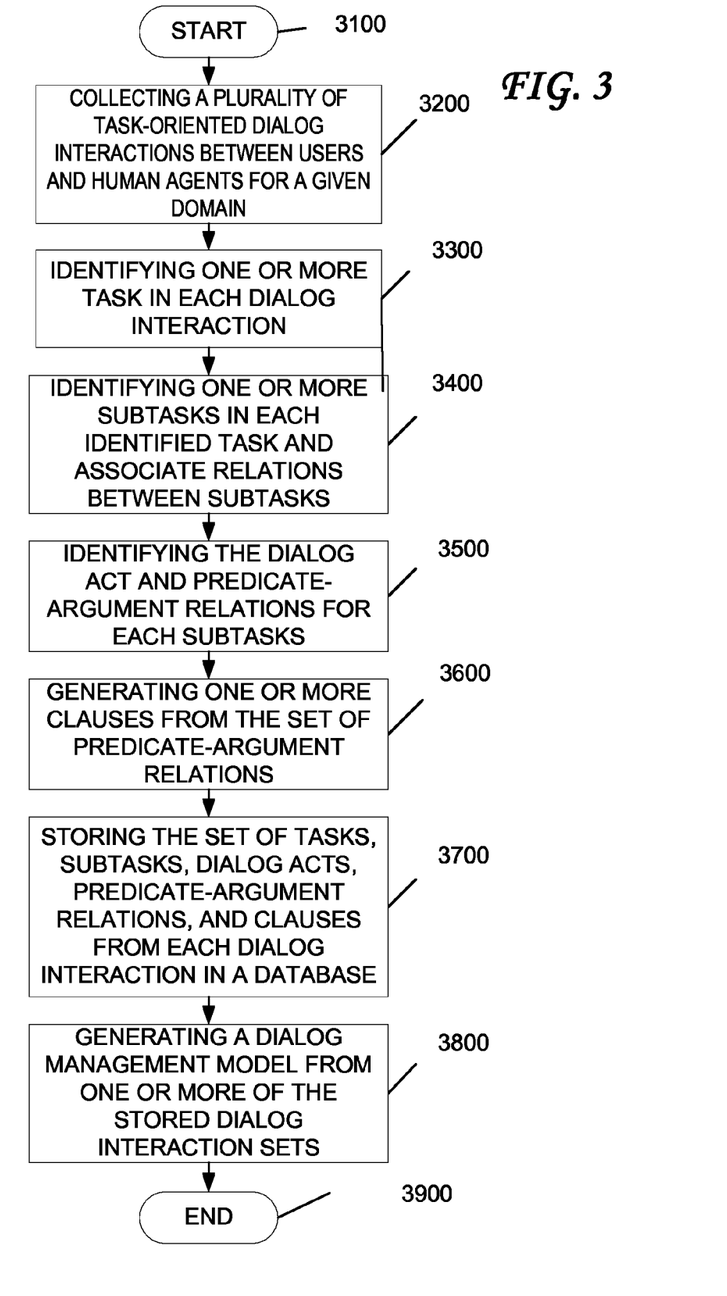
FIG. 3 illustrates an exemplary flowchart illustrating the CHILD processing method in accordance with a possible embodiment of the invention.

FIG. 3 is an exemplary flowchart illustrating some of the possible steps associated with CHILD dialog system process in accordance with a possible embodiment of the invention. The process begins at step 3100 and continues to step 3200 where the CHILD processing unit 140 collects a plurality of task-oriented dialog interactions between users and human agents for a given domain.

Figure 4:
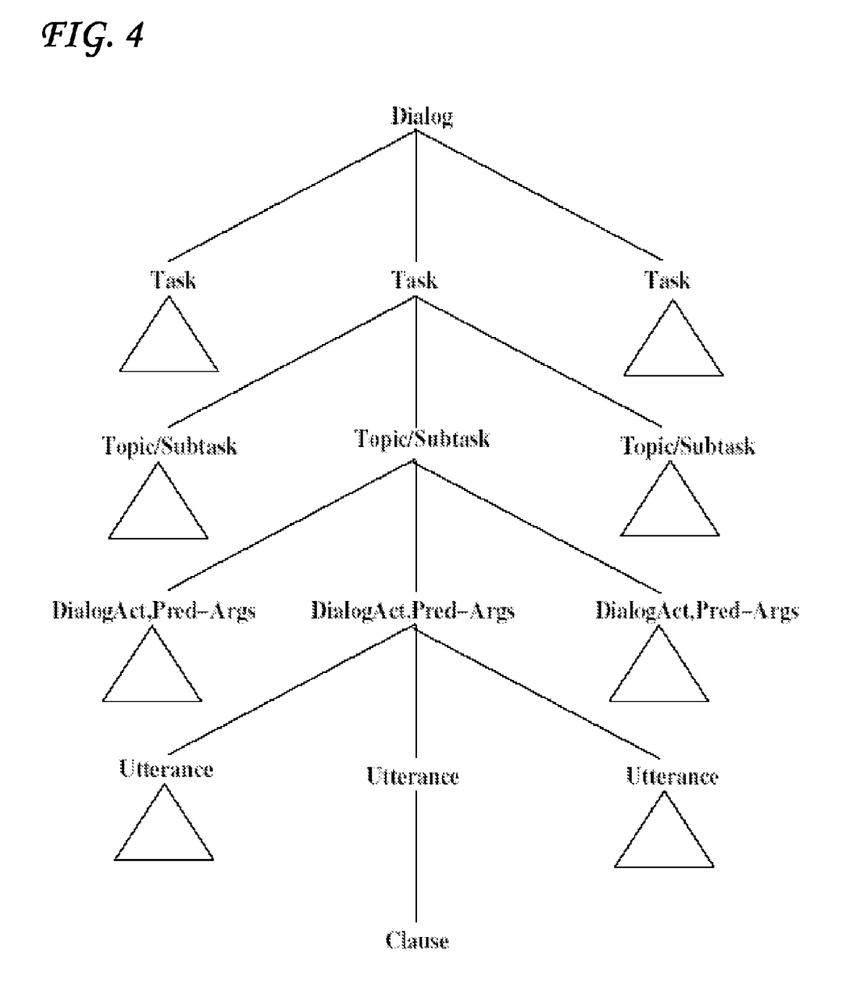
FIG. 4 illustrates an exemplary structural analysis of a dialog in accordance with a possible embodiment of the invention.

Such task-oriented dialogs may be considered to be the result of incremental creation of a shared plan by the participants. As shown in FIG. 4, the shared plan may be represented as a single tree that encapsulates the task structure (dominance and precedence relations among tasks), dialog act structure (sequences of dialog acts), and linguistic structure of utterances (inter-clausal relations and predicate-argument relations within a clause). As the dialog proceeds, an utterance from a participant is accommodated into the tree in an incremental manner, much like an incremental syntactic parser accommodating the next word into a parse tree built thus far. With this model, language understanding and dialog management may be tightly coupled using a shared representation, which leads to improved accuracy.

Thus, in step 3300, the CHILD processing unit 140 identifies one or more task in each dialog interaction. Then, in step 3400, the CHILD processing unit 140 identifies one or more subtasks in each identified task and associating relations between the subtasks.

Figure 5:
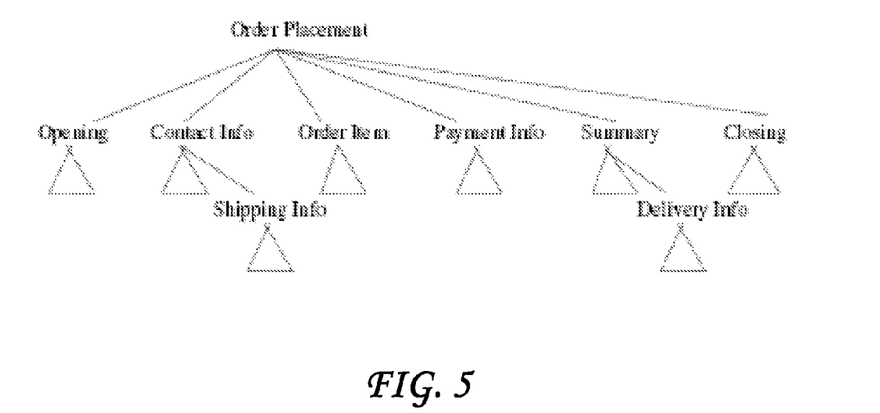
FIG. 5 illustrates an exemplary task structure in a particular domain in accordance with a possible embodiment of the invention.

FIG. 5 shows the task structure for a sample dialog in the domain of catalog ordering. As shown in the figure, an order placement task is typically composed of the sequence of subtasks opening, contact-information, order-item, related-offers, and summary. Subtasks can be nested; the nesting structure can be as deep as five levels. Most often the nesting is at the left or right frontier of the subtask tree.

Figure 6:
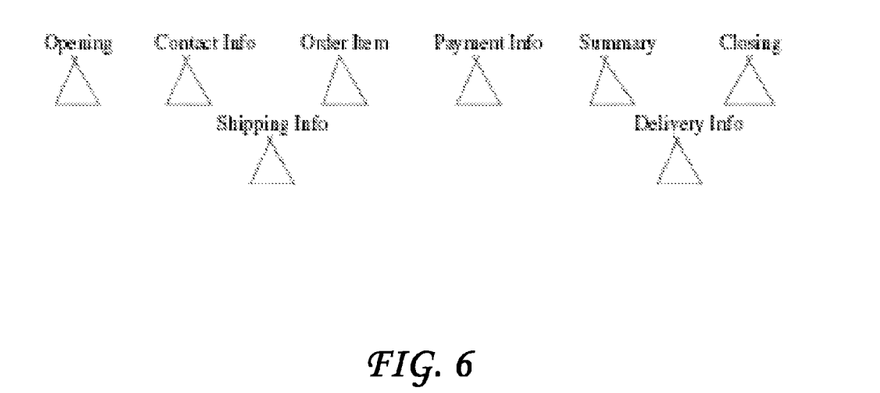
FIG. 6 illustrates an exemplary output of the chunk model's task structure in accordance with a possible embodiment of the invention.

The goal of subtask segmentation is to predict if the current utterance in the dialog is part of the current subtask or starts a new subtask. Any method known to those of skill in the art may be used for recovering the subtask structure in accordance with the invention. However, two models will be discussed for illustration purposes—a chunk-based model and a parse-based model. In the chunk-based model, the precedence relations (sequence) of the subtasks are recovered but not dominance relations (subtask structure) among the subtasks. FIG. 6 shows a sample output from the chunk model. In the parse model, the complete task structure is recovered from the sequence of utterances as shown in FIG. 5.

Returning to FIG. 3, in step 3500, the CHILD processing unit 140 identifies a dialog act and a set of predicate-argument relations for each subtask. In this regard, the CHILD processing unit 140 may annotate a user's utterance with supertags, for example. Supertags encapsulate predicate-argument information in a local structure. They are composed with each other using the substitution and adjunction operations of Tree-Adjoining Grammars, for example, to derive a dependency analysis of an utterance and its predicate-argument structure.

Dialog act tagging can also be performed using any method known to those of skill in the art. For example, a domain-specific dialog act tagging scheme based on an adapted version of the Dialog Act Mark-up in Several Layers (DAMSL) technique may be used. Any technique that is used should be particularly concerned with obtaining sufficient discriminatory power between different types of statement (for generation), and to include an out-of-domain tag (for interpretation). A sample list of dialog act tags is found below in Table 2, along with a description of experiments in automatic dialog act tagging conducted in accordance with an exemplary embodiment of the invention.

Back in FIG. 3, in step 3600, the CHILD processing unit 140 generates one or more clauses from the set of predicate-argument relations. In step 3700, the CHILD processing unit 140 stores the tasks, subtasks, dialog acts predicate-argument relations, and clauses from each dialog interaction as a dialog interaction set in the CHILD training database 150. In step 3800, the CHILD processing unit 140 generates a dialog management model using the stored dialog interaction sets. The process goes to step 3900 and ends.

During the above process, the spoken language utterances may be "cleaned up" by detecting and removing speech repairs and dysfluencies and identifying sentence boundaries. To accomplish this "clean up," the CHILD processing unit 140 may segment the recognizer 110 output of a user's utterance into clauses. The CHILD processing unit 140 may annotate an utterance for sentence boundaries, restarts and repairs, and identifies coordinating conjunctions, filled pauses and discourse markers. These annotations may be done using a cascade of classifiers known to those of skill in the art.

With respect to modeling subtask segmentation as discussed above, the chunk-based model may use tasks and subtasks rather than dialog games. In this manner, the prediction problem may be modeled as a classification task as follows: given a sequence of utterances $u_i$ a dialog $U=u_1, u_2, \ldots u_n$ and a subtask label vocabulary ($st_i \in ST$), the best subtask label sequence $ST^*=st_1, st_2, \ldots st_m$ need to be predicted as shown in equation 1.

$$ST^* = \operatorname*{argmax}_{ST} P(ST \mid U) \qquad (1)$$

Each subtask has beginning, middle (possibly absent) and end utterances. If this information is incorporated, the refined vocabulary of subtask labels is $$ST_r = \{st_i^b, st_i^m, st_i^e, | st_i \in ST\}.$$

A classifier may be used to assign to each utterance a refined subtask label conditioned on a vector of local contextual features ($\Phi$). In the interest of using an incremental left-to-right decoder, the contextual features may be restricted to be from the preceding context only. Furthermore, the search may be limited to the label sequences that respect precedence among the refined labels (begin<middle<end). This constraint is expressed in a grammar G encoded as a regular expression $$\left(L(G) = \bigcup_i st_i^b (st_i^m) * st_i^e \right) *).$$

However, in order to cope with the prediction errors of the classifier, L(G) may be approximated with an n-gram language model on sequences of the refined tag labels:

$$ST_r^* = \underset{\substack{ST_r \\ ST_r \in L(G)}}{\operatorname{argmax}} P(ST_r | U) \qquad (2)$$

$$\approx \underset{\substack{ST_r \\ ST_r \in L(G)}}{\operatorname{argmax}} \prod_i^n P(st_i | \Phi) \qquad (3)$$

A general technique for estimating the conditional distribution $P(st_i|\Phi)$ is to choose the maximum entropy distribution that properly estimates the average of each feature over the training data. This can written as a Gibbs distribution parameterized with weights $\lambda$, where V is the size of the label set. Thus, $$P(st_i | \Phi) = \frac{e^{\lambda st_i \cdot \Phi}}{\sum_{st=1}^{V} e^{\lambda st \cdot \Phi}} \qquad (4)$$

In order to increase the speed of training and scale this method to large data sets, the multiclass maxent into binary maxent may be factored. In this manner, V one-vs-other binary classifiers is used:

$$P(y | \Phi) = 1 - P(\bar{y} | \Phi) = \frac{e^{\lambda_y \cdot \Phi}}{e^{\lambda_y \cdot \Phi} + e^{\lambda_{\bar{y}} \cdot \Phi}} = \frac{1}{1 + e^{-\lambda_y^t \cdot \Phi}} \qquad (5)$$

where $\lambda_{\bar{y}}$ is the parameter vector for the antilabel $\bar{y}$ and $$\lambda_y^t = \lambda_y - \lambda_{\bar{y}}.$$

In order to compute $P(st_i|\Phi)$, $st_i$ is required to be recognized and all other labels are rejected, so the class independence assumption is realized:

$$P(st_i | \Phi) = P(st | \Phi) \prod_{st \neq st_i} P(st | \Phi)$$

As seen in FIG. 6, the chunk model does not capture dominance relations among subtasks, which are important for resolving anaphoric references. Also, the chunk model is representationally inadequate for center-embedded nestings of subtasks, which do occur in the example domain, although less frequently than the more prevalent "tail-recursive" structures.

In the parse-based model, the most likely plan tree (PT) may be found given the sequence of utterances:

$$PT^* = \underset{PT}{\operatorname{argmax}} P(PT | U) \qquad (6)$$

For real-time dialog management, a top-down incremental parser may be used that incorporates bottom-up information. In this manner, equation (6) may be rewritten to exploit the subtask sequence provided by the chunk model, as shown in below Equation 7. For the purpose of this discussion, Equation 7 is approximated using one-best (or k-best) chunk output. However, it is conceivable to parse the multiple hypotheses of chunks (encoded as a weighted lattice) produced by the chunk model.

$$PT^* = \underset{PT}{\operatorname{argmax}} \sum_{ST} P(ST | U) P(PT | ST) \qquad (7)$$

$$\approx \underset{PT}{\operatorname{argmax}} P(PT | ST^*) \qquad (8)$$

where $$ST^* = \underset{ST}{\operatorname{argmax}} P(ST | U) \qquad (9)$$

Experiments were conducted for modeling the subtask structure in accordance with the exemplary embodiments of the invention. Note that these experiments and the resulting discussion are illustrative for purposes explaining possible methods and processes that may be used in conjunction with the invention. In that regard, the experiments and the resulting discussion are in no way limiting to any aspect of this invention.

As the primary data set used in the experiments discussed below, 915 telephone-based customer-agent dialogs are used that relate to the task of ordering products from a catalog. Each dialog was transcribed by hand; all numbers (telephone, credit card, etc.) were removed for privacy reasons. The average dialog lasted for 3.71 minutes and included 61.45 changes of speaker. A single customer-service representative might participate in several dialogs, but customers are represented by only one dialog each. Although the majority of the dialogs were on-topic, some were idiosyncratic, including: requests for order corrections, transfers to customer service, incorrectly dialed numbers, and long friendly out-of-domain asides. Annotations applied to these dialogs include: utterance segmentation, syntactic annotation, dialog act tagging and subtask segmentation. The former two annotations are domain independent while the latter are domain-specific.

Offline natural language processing systems, such as part-of-speech taggers and chunkers, rely on both static and dynamic features. Static features are derived from the local context of the text being tagged. Dynamic features are computed based on previous predictions. The use of dynamic features usually requires a search for the globally optimal sequence, which is not possible when doing incremental processing. For dialog act tagging and subtask segmentation during dialog management, incremental prediction may be used since it would be unrealistic to wait for the entire dialog before proceeding to decode. Thus, in order to train the dialog act (DA) and subtask segmentation classifiers, only static features from the current and left context are used as shown in Table 1 (however, dynamic contexts could be used as well and a greedy decoding algorithm may be adopted instead of a Viterbi search). This obviates the need for constructing a search network and performing a dynamic programming search during decoding. In lieu of the dynamic context, larger static context is used to compute features—word trigrams and trigrams of words annotated with supertags computed from up to three previous utterances.

TABLE 1

Features used for the classifiers.

| Label Type | Features |
| --- | --- |
| Dialog Acts | Speaker, word trigrams from current/previous utterance(s) supertagged utterance |
| Subtask | Speaker, word trigrams from current utterance, previous utterance(s)/turn |

For dialog act labeling, models are built from several corpora, including the Maptask and Switchboard-DAMSL corpora. From the files for the Maptask corpus, the moves, words and speaker information (follower/giver) are extracted. Instead of using the raw move information, each move was augmented with speaker information, so that for example, the instruct move was split into instruct-giver and instruct-follower, for example. For the Switchboard corpus, the original labels were clustered to remove most of the multidimensional tags and to combine tags with minimum training data. For all corpora, non-sentence elements (e.g., dysfluencies such as filler, discourse markers, etc.) and restarts (with and without repairs) were kept; non-verbal content (e.g., laughs, background noise, etc.) was removed.

As discussed above, a domain-specific tag set containing 67 dialog act tags is used for the catalog corpus. In Table 2, examples of tags are given. 864 clauses from 20 dialogs selected at random from our corpus were manually annotated. Two dialogs, selected at random from these 20, were used for testing. In this annotation, a single utterance may have multiple dialog act labels. For experiments with the Switchboard-DAMSL corpus, 42 dialog act tags obtained by clustering over the 375 unique tags in the data were used. This corpus has 1155 dialogs and 218,898 utterances; 173 dialogs, selected at random, were used for testing. The Maptask tagging scheme has 12 unique dialog act tags; augmented with speaker information results in 24 tags. This corpus has 128 dialogs and 26181 utterances; and a ten-fold cross validation was used for testing.

TABLE 2

Sample set of dialog act labels

| Type | Subtype |
| --- | --- |
| Ask | Catalog, CC_Related, Discount, Order_Info Order_Problem, Payment_Rel, Product_Info Promotions, Related_Offer, Shipping |
| Conversational | Ack, Goodbye, Hello, Help, Hold, YoureWelcome, Thanks, Yes, No, Ack Repeat, Not(Information) |
| Request | Code, Order_Problem, Address, Catalog, CC_Related, Change_Order, Conf, Credit, Customer_Info, Info, Make_Order, Name, Order-Info, Order_Status, Payment_Rel, Phone_Number, Product_Info, Promotions, Shipping, Store_Info |
| YNQ | Address, Email, Info, Order_Info, Order_Status, Promotions, Related_Offer |

Table 3 shows the error rates for automatic dialog act labeling using word trigram features from the current and previous utterance. Error rates for the various tag sets are compared using the same features and the same classifier learner. The error rates for the catalog and the Maptask corpus are an average of ten-fold cross-validation. The larger error rate for the catalog domain compared to Maptask and Switchboard might be due to the small size of our annotated corpus (about 2K utterances for our domain as against about 20K utterances for Maptask and 200K utterances for DAMSL). However, the error rates for the Switchboard-DAMSL are significantly better than previously results (28% error rate) with the same tag set. This improvement may be attributable to the richer feature set used and a discriminative modeling framework that supports large number of features, in contrast to the generative model used in previous experiments. A similar observation applies to the results on Maptask dialog act tagging in that they proved to outperform previously published results (42.8% error rate).

In labeling the Switchboard data, long utterances were split into slash units. A speaker's turn can be divided in one or more slash units and a slash unit can extend over multiple turns, for example:
sv B.64 utt3: C but, F uh.
b A.65 utt1: Uh-huh./
+ B.66 utt1: . people want all of that/
sv B.66 utt2: C and not all of those are necessities./
b A.67 utt1: Right./

The labelers were instructed to label on the basis of the whole slash unit. This labeling process makes, for example, the dysfluency turn B.64 a Statement opinion (sv) rather than a non-verbal. For the purpose of discriminative learning, this process could introduce noisy data since the context associated to the labeling decision shows later in the dialog. To address this issue, 2 classifiers are compared: the first (non-merged), simply propagates the same label to each continuation, cross turn slash unit; the second (merged) combines the units in one single utterance. Although the merged classifier breaks the regular structure of the dialog, the results in Table 3 show better overall performances.

TABLE 3

Error rates in dialog act tagging

| Tagset | Current utterance | +staged utterance | +3 previous (stagged) utterance |
| --- | --- | --- | --- |
| Catalog Domain | 46.3 | 46.1 | 42.2 |
| DAMSL (non-merged) | 24.7 | 23.8 | 19.1 |

TABLE 3-continued

Error rates in dialog act tagging

| Tagset | Current utterance | +staged utterance | +3 previous (stagged) utterance |
|---|---|---|---|
| DAMSL (merged) | 22.0 | 20.6 | 16.5 |
| Maptask | 34.3 | 33.9 | 30.3 |

For subtask labeling, a random partition of 864 dialogs from the catalog domain is used as the training set and 51 dialogs as the test set. All the dialogs were annotated with subtask labels by hand. A set of 18 labels grouped as shown in Table 4 below are used.

TABLE 4

Subtask label set

| Type | Subtask Labels |
|---|---|
| 1 | opening, closing |
| 2 | contact-information, delivery-information, payment-information, shipping-address, summary |
| 3 | order-item, related-offer, order-problem discount, order-change, check-availability |
| 4 | call-forward, out-of-domain, misc-other, sub-call |

Table 5 shows error rates on the test set when predicting refined subtask labels using word n-gram features computed on different dialog contexts. The well-formedness constraint on the re-fined subtask labels significantly improves prediction accuracy. Utterance context is also very helpful; just one utterance of left-hand context leads to a 10% absolute reduction in error rate, with further reductions for additional context. While the use of trigram features helps, it is not as helpful as other contextual information. The dialog act tagger trained from Switchboard-DAMSL corpus is used to automatically annotate the catalog domain utterances. These tags are included as features for the classifier, however, no improvement in the error rates was seen, probably due to the high error rate of the dialog act tagger. The error rates without the well-formedness constraint is shown in parenthesis. The error rates with dialog acts as features are separated by a slash.

TABLE 5

Error rate for predicting the refined subtask labels.

| | Utterance Context | | |
|---|---|---|---|
| Feature Context | Current utt/with DA | +prev utt/with DA | +three prev utt/with DA |
| Unigram | 42.9/42.4 (53.4/52.8) | 33.6/34.1 (43.0/43.0) | 30.0/30.3 (37.6/37.6) |
| Trigram | 41.7/41.7 (52.5/52.0) | 31.6/31.4 (42.9/42.7) | 30.0/29.1 (37.6/37.4) |

A top-down incremental parser was retrained on the plan trees in the training dialogs. For the test dialogs, the k-best (k=50) refined subtask labels were used for each utterance as predicted by the chunk-based classifier to create a lattice of subtask label sequences. For each dialog n-best sequences (100-best for these experiments) of subtask labels were created; these were parsed and (re-)ranked by the parser. The weights of the subtask label sequences assigned by the classifier were combined with the parse score assigned by the parser and the top scoring sequence was selected from the list for each dialog. The results are shown in Table 6. It can be seen that using the parsing constraint does not help the subtask label sequence prediction significantly. The chunk-based model gives almost the same accuracy, and is incremental and more efficient.

TABLE 6

Error rates for task structure prediction, with no constraints, sequence constraints and parser constraints

| | Constraints | | |
|---|---|---|---|
| Features | No Constraint | Sequence Constraint | Parser Constraint |
| Current Utt | 54.4 | 42.0 | 41.5 |
| +DA | 53.8 | 40.5 | 40.2 |
| Current + Prev Utt | 41.6 | 27.7 | 27.7 |
| +DA | 40.0 | 28.8 | 28.1 |
| Current + 3 Prev Utt | 37.5 | 24.7 | 24.7 |
| +DA | 39.7 | 29.6 | 28.9 |

The CHILD processing method involves but one step, albeit a crucial one, towards achieving the goal of inducing human-machine dialog systems using human-human dialogs. The dialog structure is necessary for language generation (predicting the agents' response) and dialog state specific text-to-speech synthesis. The structuring of dialogs has another application in call center analytics. It is routine practice to monitor, analyze and mine call center data based on indicators such as the average length of dialogs, the task completion rate in order to estimate the efficiency of a call center. By incorporating structure to the dialogs, as discussed herein, the analysis of dialogs can be performed at a more fine-grained (task and subtask) level.

Note that this invention may apply to any automated recognition and understanding system that receives communications from external sources, such as users, customers, service providers, associates, etc. Consequently, the method may operate in conjunction with one or more communication networks, including a telephone network, the Internet, an intranet, Cable TV network, a local area network (LAN), a wireless communication network, etc.

The communications received by the system may be verbal, nonverbal, multimodal, etc. Examples of nonverbal communications include the use of gestures, body movements, head movements, non-responses, text, keyboard entries, keypad entries, mouse clicks, DTMF codes, pointers, stylus, cable set-top box entries, graphical user interface entries, touchscreen entries, etc. Multimodal communications involve communications on a plurality of channels, such as aural, visual, etc. However, for ease of discussion, the method and system of the invention are discussed below in relation to automated telecommunication systems.

Although the above description may contain specific details, they should not be construed as limiting the claims in any way. Other configurations of the described embodiments of the invention are part of the scope of this invention. For example, the principles of the invention may be applied to each individual user where each user may individually deploy such a system. This enables each user to utilize the benefits of the invention even if some or all of the conferences the user is attending do not provide the functionality described herein. In other words, there may be multiple instances of the CHILD processing unit 140 in FIGS. 1 and 2 each processing the content in various possible ways. It does not necessarily need to be one system used by all end users. Accordingly, the appended claims and their legal equivalents should only define the invention, rather than any specific examples given.

We claim:
1. A method comprising:
    collecting a plurality of task-oriented, human-human dialog interactions between users and human agents for a given domain;
    after collecting the plurality of task-oriented, human-human dialog interactions, extracting, via a processor, a respective dialog structure associated with each of the plurality of task-oriented, human-human dialog interactions, wherein extracting the respective dialog structure comprises:
        identifying a respective task in each of the plurality of task-oriented, human-human dialog interactions;
        identifying subtasks in the respective task and associating relations between the subtasks, wherein the identifying of the subtask is done using a chunk model equation PT*=argmax $\Sigma_{ST}$ P(ST|U)P(PT|ST), where PT* is the most likely plan tree, ST is each subtask in a sequence of utterances U, PT represents likelihood of each plan tree, and P represents the individual probabilities within the chunk model equation, where the chunk model equation uses the respective dialog structures U and ST as a weighted lattice; and
        identifying a dialog act and a set of predicate-argument relations for the subtasks by annotating user utterances in the plurality of task-oriented, human-human dialog interactions with tags;
        generating a clause from the set of predicate-argument relations;
    removing speech repairs and dysfluencies from a respective user utterance in each of the plurality of task-oriented, human-human dialog interactions; and
    storing the respective task, the subtasks, the dialog act, the set of predicate-argument relations, the clause, inter-clausal relations within the clause, and a set of dominance and precedence relations associated with the respective task as a dialog interaction set represented as a single tree.

2. The method of claim 1, further comprising:
    identifying named entities for each subtask;
    identifying labels for the named entities; and
    storing the labels in the dialog interaction set.

3. The method of claim 1, wherein the predicate-argument relations are identified using supertags.

4. The method of claim 1, wherein the subtasks are identified using a chunk-based model.

5. The method of claim 1, wherein the subtasks are identified using a parse-based model.

6. The method of claim 1, wherein the subtasks are segmented into beginning, middle and end utterances.

7. The method of claim 1, further comprising generating a dialog management model using the dialog interaction set.

8. A computer-readable storage device having instructions stored which, when executed by a computing device, cause the computing device to perform operations comprising:
    collecting a plurality of task-oriented, human-human dialog interactions between users and human agents for a given domain;
    after collecting the plurality of task-oriented, human-human dialog interactions, extracting a respective dialog structure associated with each of the plurality of task-oriented, human-human dialog interactions, wherein extracting the respective dialog structure comprises:
        identifying a respective task in each of the plurality of task-oriented, human-human dialog interactions;
        identifying subtasks in the respective task and associating relations between the subtasks, wherein the identifying of the subtask is done using a chunk model equation PT*=argmax $\Sigma_{ST}$ P(ST|U)P(PT|ST), where PT* is the most likely plan tree, ST is each subtask in a sequence of utterances U, PT represents likelihood of each plan tree, and P represents the individual probabilities within the chunk model equation where the chunk model equation uses the respective dialog structures U and ST as a weighted lattice; and
        identifying a dialog act and a set of predicate-argument relations for the subtasks by annotating user utterances in the plurality of task-oriented, human-human dialog interactions with tags;
        generating a clause from the set of predicate-argument relations;
    removing speech repairs and dysfluencies from a respective user utterance in each of the plurality of task-oriented, human-human dialog interactions;
    storing the respective task, the subtasks, the dialog act, the set of predicate-argument relations, the clause, inter-clausal relations within the clause, and a set of dominance and precedence relations associated with the respective task as a dialog interaction set represented as a single tree.

9. The computer-readable storage device of claim 8 the computer-readable storage device having additional instructions stored which result in the operations further comprising:
    identifying named entities for the subtasks;
    identifying labels for the named entities; and
    storing the labels in the dialog interaction set.

10. The computer-readable storage device of claim 8, wherein the predicate-argument relations are identified using supertags.

11. The computer-readable storage device of claim 8, wherein the subtasks are identified using a chunk-based model.

12. The computer-readable storage device of claim 8, wherein the subtasks are identified using a parse-based model.

13. The computer-readable storage device of claim 8, wherein the subtasks are segmented into beginning, middle and end utterances.

14. The computer-readable storage device of claim 8, the computer-readable storage device having additional instructions stored which result in the operations further comprising generating a dialog management model using the dialog interaction set.

15. A system comprising:
    a processor; and
    a computer readable storage medium having stored therein instructions which, when executed by the processor, cause the processor to perform operations comprising:
        collecting a plurality of task-oriented, human-human dialog interactions between users and human agents for a given domain;
        after collecting the plurality of task-oriented, human-human dialog interactions, extracting, via a processor, a respective dialog structure associated with each of the plurality of task-oriented, human-human dialog interactions, wherein extracting the respective dialog structure comprises:
            identifying a respective task in each of the plurality of task-oriented, human-human dialog interactions;
            identifying subtasks in the respective task and associating relations between the subtasks, wherein the identifying of the subtask is done using a chunk model equation PT*=argmax $\Sigma_{ST}$ P(ST|U)P(PT|ST), where PT* is the most likely plan tree, ST is each subtask in a sequence of utterances U, PT represents likelihood of each plan tree, and P represents the individual probabilities within the chunk model equation, where the chunk model equation uses the respective dialog structures U and ST as a weighted lattice; and identifying a dialog act and a set of predicate-argument relations for the subtasks by annotating user utterances in the plurality of task-oriented, human-human dialog interactions with tags;

generating a clause from the set of predicate-argument relations;

removing speech repairs and dysfluencies from a respective user utterance in each of the plurality of task-oriented, human-human dialog interactions; and storing the respective task, the subtasks, the dialog act, the set of predicate-argument relations, the clause, inter-clausal relations within the clause, and a set of dominance and precedence relations associated with the respective task as a dialog interaction dataset represented as a single tree.

16. The system of claim 15, the computer-readable storage medium having additional instructions stored which result in the operations further comprising:
   identifying named entities for the subtasks;
   identifying labels for the named entities; and
   storing the labels in a Child training database.

17. The system of claim 15, wherein the predicate-argument relations are identified using supertags.

18. The system of claim 15, wherein the subtasks are identified using one of a chunk-based model and a parse-based model.

19. The system of claim 15, the computer readable storage medium having additional instructions stored which result in the operations further comprising segmenting the subtasks into beginning, middle and end utterances.

20. The system of claim 15, the computer readable storage medium having additional instructions stored which result in the operations further comprising generating a dialog management model using the dialog interaction set.

* * * * *